US011158113B1

United States Patent
Weidlich et al.

(10) Patent No.: US 11,158,113 B1
(45) Date of Patent: *Oct. 26, 2021

(54) INCREASING THE SPEED OF COMPUTATION OF A VOLUMETRIC SCATTERING RENDER TECHNIQUE

(71) Applicant: Weta Digital Ltd., Wellington (NZ)

(72) Inventors: Andrea Weidlich, Montreal (CA); Marc Droske, Wellington (NZ)

(73) Assignee: Weta Digital Ltd., Wellington (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 17/355,082

(22) Filed: Jun. 22, 2021

Related U.S. Application Data

(60) Provisional application No. 63/210,926, filed on Jun. 15, 2021.

(51) Int. Cl.
*G06T 15/06* (2011.01)
*G06T 15/50* (2011.01)

(52) U.S. Cl.
CPC .............. *G06T 15/06* (2013.01); *G06T 15/50* (2013.01)

(58) Field of Classification Search
CPC ........ G06T 15/06; G06T 15/08; G06T 15/506
See application file for complete search history.

(56) References Cited

U.S. PATENT DOCUMENTS

2018/0061111 A1* 3/2018 Engel ..................... G06T 15/08

OTHER PUBLICATIONS

Li, Hongsong, Fabio Pellacini, and Kenneth E. Torrance. "A Hybrid Monte Carlo Method for Accurate and Efficient Subsurface Scattering." Rendering Techniques 2005 (2005): 16th. (Year: 2005).*

* cited by examiner

*Primary Examiner* — Ryan McCulley
(74) *Attorney, Agent, or Firm* — Perkins Coie LLP

(57) ABSTRACT

Presented here is a system and method to increase the speed of computation of a volumetric scattering render technique. The volumetric scattering can include path tracing which simulates interactions between a virtual ray of light and a volume. The interaction can include reflection of the virtual ray of light of a particle within the volume. The system can obtain a threshold number of interactions between a virtual ray of light and a three-dimensional object through which the virtual ray of light is traveling. As the system performs the simulation, the system can compare a number of the interactions to the threshold number. Upon determining that the number of interactions is equal to or exceeds the threshold number, the system can terminate the simulation and approximate interactions between the virtual ray of light and the volume using a second rendering technique that is computationally less expensive than simulating the interactions.

20 Claims, 15 Drawing Sheets
(5 of 15 Drawing Sheet(s) Filed in Color)

INCREASING THE SPEED OF COMPUTATION OF A VOLUMETRIC SCATTERING RENDER TECHNIQUE

CROSS-REFERENCE TO RELATED APPLICATIONS

This application claims priority to the U.S. provisional patent application Ser. No. 63/210,926 filed Jun. 15, 2021 which is incorporated herein by reference in its entirety.

BACKGROUND

Subsurface scattering (SSS), also known as subsurface light transport (SSLT), is a mechanism of light transport in which light that penetrates the surface of a translucent object is scattered by interacting with the material and exits the surface at a different point. The light will generally penetrate the surface and be reflected a number of times at irregular angles inside the material before passing back out of the material at a different angle than it would have had it had been reflected directly off the surface. Subsurface scattering is important for realistic 3D computer graphics, where it is necessary for the rendering of materials such as marble, skin, leaves, wax, clouds, milk, etc. If subsurface scattering is not implemented, the material may look unnatural, like plastic or metal. One drawback of subsurface scattering is the computational cost required to compute it.

SUMMARY

Presented here is a system and method to increase the speed of computation of a volumetric scattering render technique. The volumetric scattering render technique can include path tracing that simulates interactions between a virtual ray of light and a three-dimensional object such as a volume. The three-dimensional object can be smoke, cloud, marble, skin, milk, etc. The interaction can include reflection of the virtual ray of light of a particle within the volume.

The system can obtain a threshold number of interactions between a virtual ray of light and a three-dimensional object through which the virtual ray of light is traveling. As the system performs the simulation, the system can compare a number of the simulated interactions to the threshold number. Upon determining that the number of simulated interactions is equal to or exceeds the threshold number, the system can terminate the simulation and approximate interactions between the virtual ray of light and the three-dimensional object using a second rendering technique that is computationally less expensive than simulating the interactions. The second rendering technique can include a closed form solution, a dipole approximation, a sum of Gaussians approximation, etc.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Detailed descriptions of implementations of the present invention will be described and explained through the use of the accompanying drawings.

Figure 1:
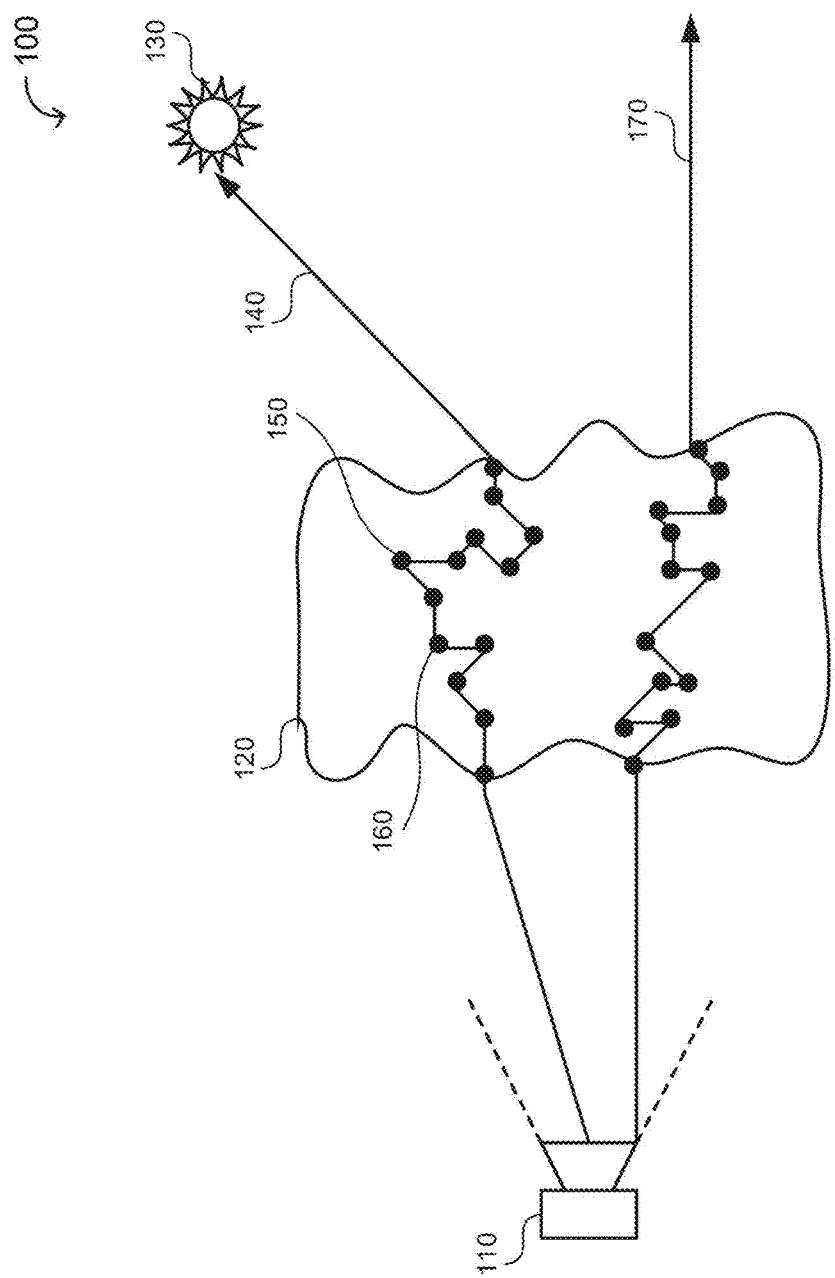
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Increasing the Speed of Computation of a Volumetric Scattering Render Technique

The system presented here combines an expensive-and-accurate volumetric scattering rendering technique, namely, simulating interactions of a virtual ray and particles inside the volume and a less computationally expensive technique that approximates the results obtained from the simulation. The simulation can utilize path tracing. Path tracing traces a virtual ray of light ("ray") coming from a light source or a camera through a volume. The ray can include one or more wavelengths of electromagnetic radiation. The ray is refracted upon entering the volume and proceeds to travel through the volume interacting with the volume particles. The path tracing technique simulates the interactions between the ray and the volume, such as reflection, scattering, and absorption, that generate a random path that the ray takes traveling through the volume.

To reduce the amount of computation in path tracing, the user can specify a threshold indicating a certain number of reflections of the ray within the volume, after which the path tracing computation stops. If the ray exits the surface prior to crossing the threshold, the contribution of the ray to the surface color is computed. If the ray does not exit the surface prior to crossing the threshold, the tracing of the ray within the volume is terminated, and the contribution of the ray to the surface color is calculated using the less computationally expensive technique. The less computationally expensive technique can be a closed form solution, a dipole approximation, and/or a sum of Gaussians approximation, etc.

FIG. 1 shows multiple virtual rays traveling through a volume. The camera 110 creates an image of a scene 100 including a three-dimensional object 120 and a light source 130. The three-dimensional object ("object" or "volume") 120 represents a volume through which light coming from the light source 130 can scatter, such as marble, skin, leaves, wax, clouds, fog, milk, etc. A virtual ray 140 represents a light ray scattering through the object 120. In materials that scatter light, the contribution of scattered light significantly contributes to the quality of the final image.

Volumetric scattering is a rendering technique that attempts to simulate the scattering of light between the light source 130 and the camera 110. Path tracing is a volumetric scattering technique. Path tracing emits a virtual ray of light 140 from the camera 110, scatters the ray through the volume 120 at multiple points 150, 160 (only two labeled for brevity), and traces the ray back to the light source 130. A scattering event includes the virtual ray of light 140 reflecting from a particle in the volume 120. A ray that does not reach the light source 130, such as ray 170, contributes no color to the final pixel in the image and is ignored.

To generate a high-quality image, a rendering system ("renderer") randomly generates millions of rays per pixel, such as ray 140, per frame. Each ray 140 can scatter multiple times, such as hundreds of times, while traveling through the volume 120. Simulating hundreds of scattering events for millions of pixels millions of times becomes computationally expensive. Further, as the number of scattering events 150, 160 increases, the contribution of the ray 140 to the final pixel color decreases.

Figure 2:
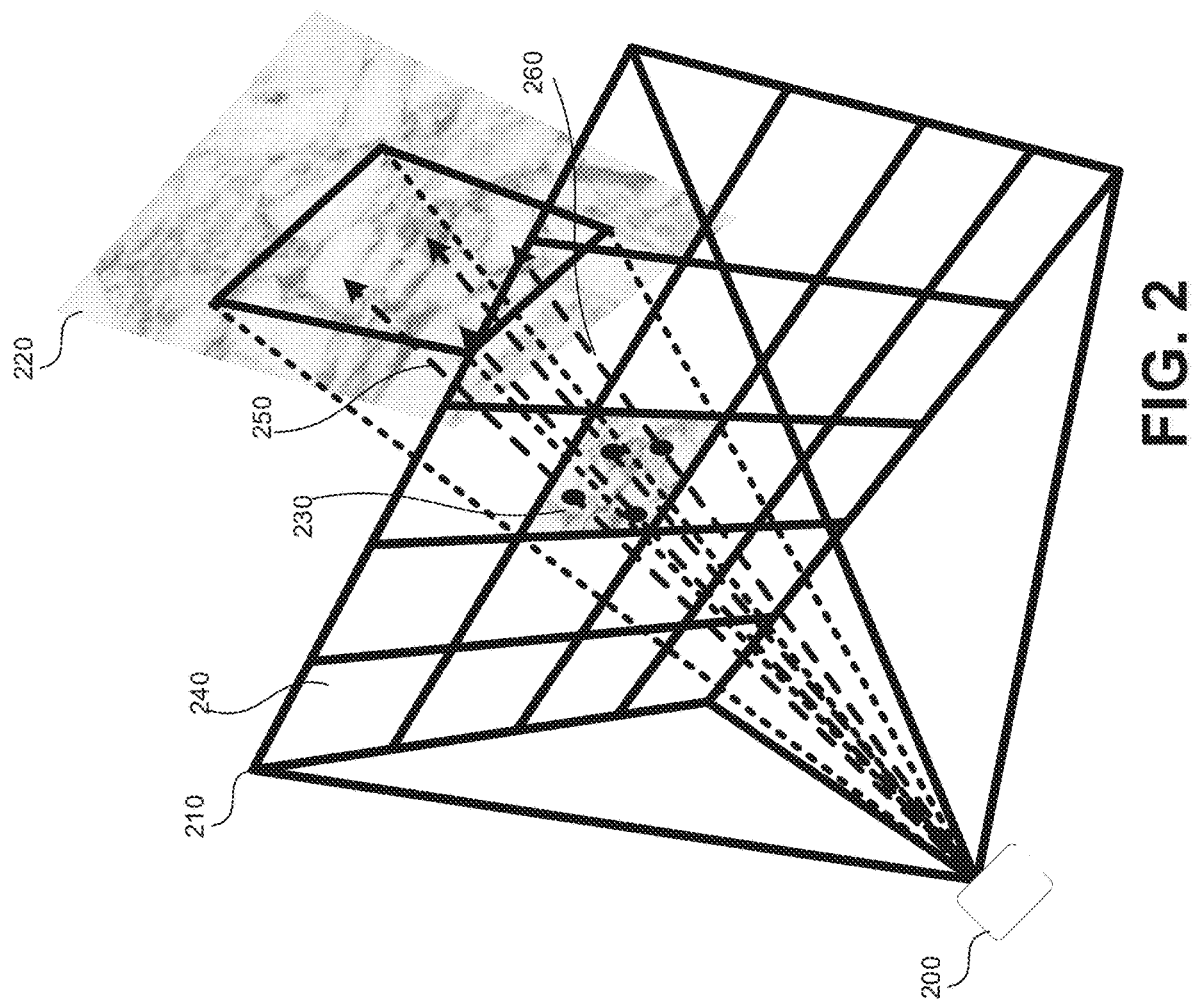
FIG. 2 shows multiple rays generated per pixel.

FIG. 2 shows multiple rays generated per pixel. The camera 200 records an image 210 of the object 220. The image 210 contains multiple pixels 230, 240 (only two labeled for brevity). To create the image 210, a renderer generates multiple rays 250, 260 (only two labeled for brevity) per pixel 230, 240. Even though the full set of rays 250, 260 do not cover the area of the pixel 230, the renderer generates millions of rays, and the color computed for each of the millions of rays approximates the true pixel 230 color.

When recording a sequence of images such as for a movie or video, the renderer generates independent and different rays for subsequent images, that is, frames, in the sequence. That is, the rays for frame N can be as shown in FIG. 2, while the rays for frame N+1 go through different points in the pixel 230 than the rays 250, 260. The random variation of rays from frame to frame enables generating aesthetically pleasing images. By contrast, if the same rays were used for all the frames, the viewer of the movie or the video would be under the impression that the movie was recorded through a shower curtain. The rays generated between different frames can be generated according to the Monte Carlo sampling principle.

Figure 3A:
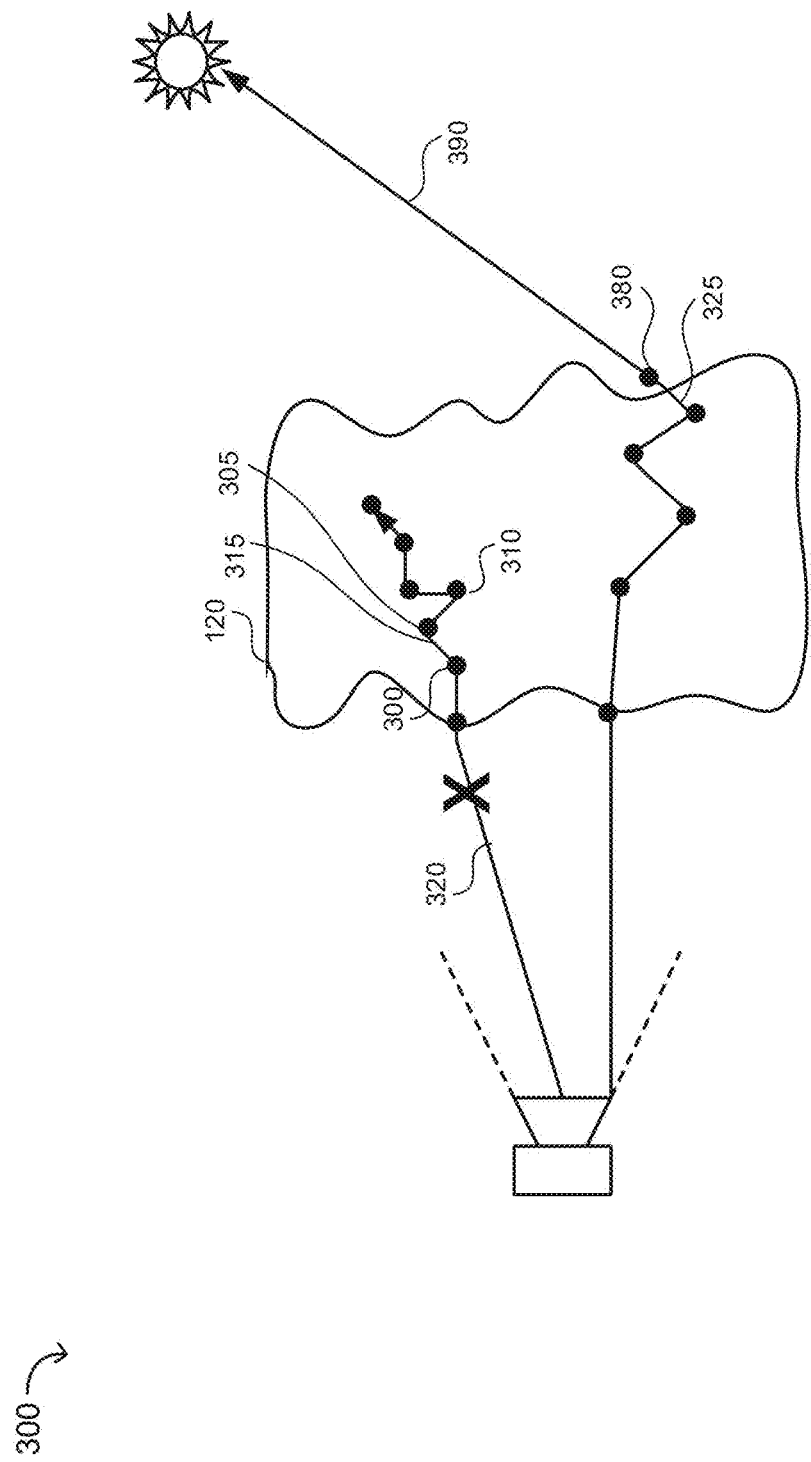
FIGS. 3A-3B show methods to increase a speed of computation of a volumetric scattering render technique.
Figure 3B:
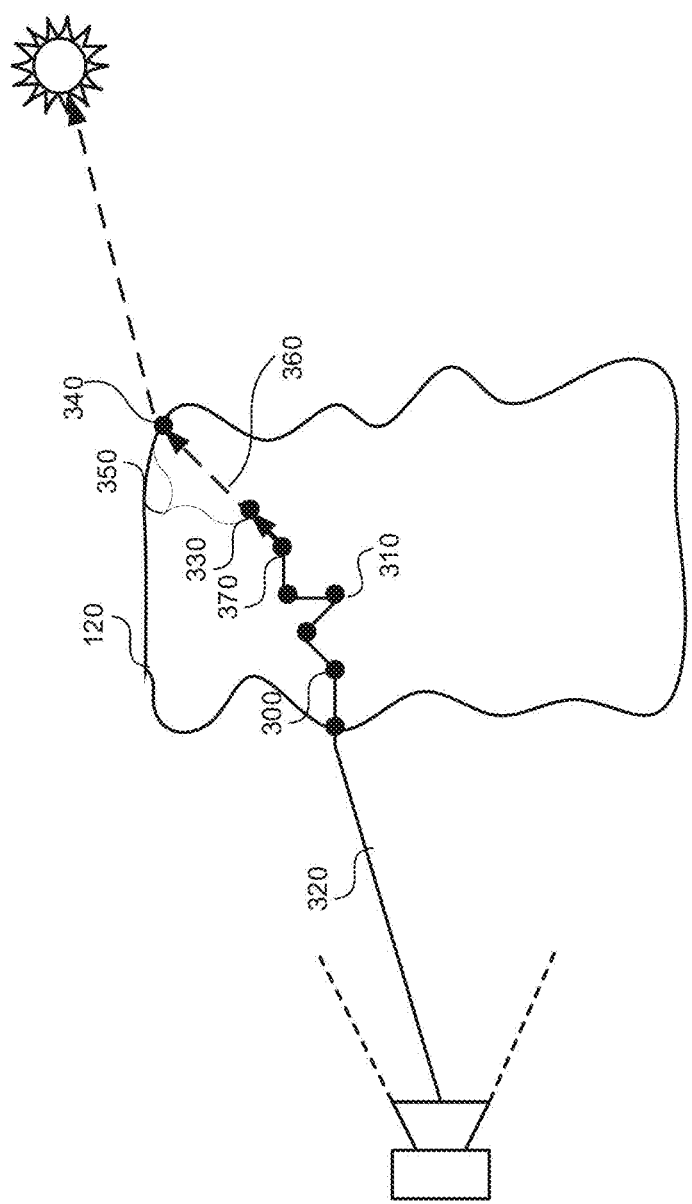

FIGS. 3A-3B show methods to increase a speed of computation of a volumetric scattering render technique. As seen in FIGS. 3A-3B, the renderer can simulate multiple interactions 300, 310 between the virtual ray of light 320 and the volume 120.

To perform path tracing, the renderer takes steps of predetermined length along a direction of the virtual ray of light 320. The predetermined length can be a millimeter or a centimeter. The renderer can take a step along a virtual ray 325 and reach the point 380. The renderer can determine whether the point 380 is inside the volume 120 or not. If the point 380 is outside of the volume, the renderer can trace the path 390 to the light source to determine the illumination at the point 380.

Similarly, the renderer can take a step and reach the point 300. The renderer can determine whether the point 300 is inside the volume 120 or not. If the point 300 is inside the volume, the renderer determines the probability that the ray 320 bounces in a direction 315. The probability of the bouncing in direction 315 influences the computation of the color of the final pixel. For example, the probability can multiply the color of the ray 320 at the scattering event 300. The final pixel color can be a sum of probabilities multiplied by colors at each of the scattering events 300, 305, 310. The renderer takes another step in the direction 315, and again determines whether the point 305 is inside or outside the volume 120. The virtual ray of light 320 can reflect hundreds or even thousands of times inside the volume 120 before exiting the volume. However, such numerous reflections increase the computation time of the path tracing simulation.

The renderer can obtain a computational threshold indicating when the simulation should be terminated. The computational threshold can include a number of interactions 300, 310 between the ray 320 and the volume 120. For example, the computational threshold can be 4 or 6 interactions.

Upon determining that the number of the multiple interactions exceeds the computational threshold, the renderer can terminate the simulation. For example, when the number of interactions 300, 310 exceeds four interactions, the renderer can terminate the simulation, and it can approximate interactions between the virtual ray of light 320 and the three-dimensional object 120 using a second rendering technique computationally less expensive than simulating the multiple interactions. The second rendering technique can be hundreds of times faster than the simulation. The speed of execution of the second rendering technique cannot exceed a computational threshold, namely, the speed of execution of simulating the multiple interactions.

The second rendering technique can fall into one of two categories: a scattering approximation or a closed form solution. FIG. 3A shows a scattering approximation. A scattering approximation can include various rendering techniques such as dipole rendering, multipole rendering, sum of Gaussians, etc. The scattering approximation techniques approximate the interaction of the ray 320 and the volume 120 without simulating individual rays of light scattering through the volume 120. Consequently, the scattering approximations are computationally faster than path tracing.

In one embodiment, called "path probing," when the renderer terminates the simulation, the renderer can discard the color contribution of the ray 320 that can be computed using path tracing, and instead, the renderer can compute the color contribution of the ray 320 using the scattering approximation. In another embodiment, when the renderer terminates the simulation, the renderer can combine the color contribution of the ray 320 that is computed using path tracing and the color contribution of the scattering approximation. The scattering approximation can be used to determine the color contribution of the ray 320 more cheaply than the simulation.

FIG. 3B shows the closed form solution. In the closed form solution, after the computational threshold is reached, for example 6 reflections 300, 310, the renderer terminates the simulation and employs a formula to approximate subsequent scattering events. In this case, the renderer combines the color computed using the path tracing and the color computed using the closed form solution, to compute the final color of the pixel. For example, the renderer can add the color computed using the path tracing and the color computed using the closed form solution, to compute the final color of the pixel.

The formula to approximate subsequent scattering depends on a distance 350 between the termination point 330 and an exit point 340 from the volume 120. The distance 350 is computed in the direction 360 of the ray 320 after the last scattering event 370. Further, the formula depends on the properties of the volume 120 such as absorption coefficient, scattering coefficient, etc. The absorption coefficient indicates how likely the ray 320 is to be absorbed by the volume 120, while the scattering coefficient indicates how likely the ray 320 is to scatter in the volume 120. When the ray 320 is absorbed, the ray extinguishes and adds no illumination to the volume 120. When the ray 320 scatters, the ray changes direction and continues its path through the volume 120 along the changed direction until the next scattering event. The distance between the scattering event and the next scattering event is indicated by the scattering coefficient.

Figure 4:
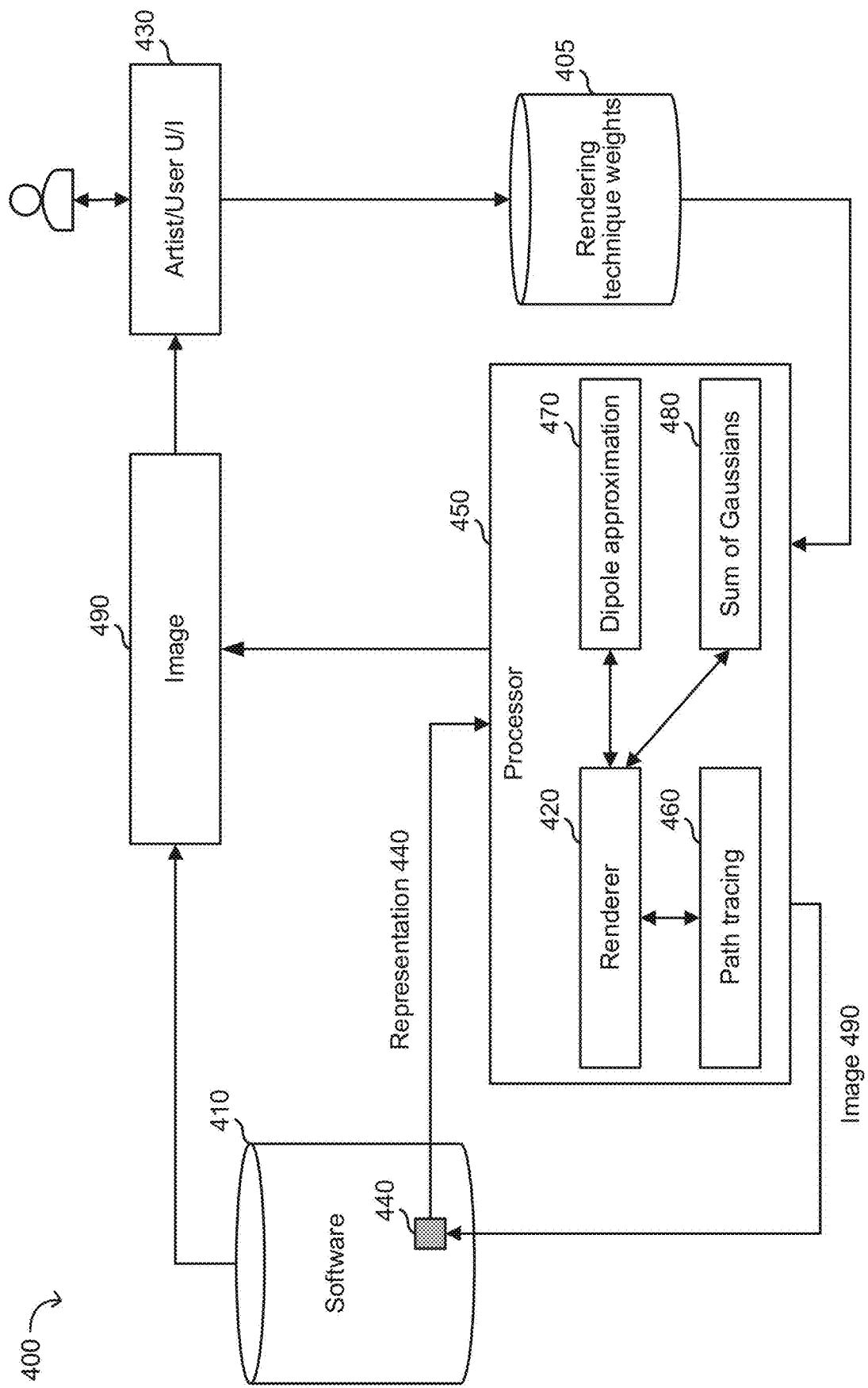
FIG. 4 shows a system to present the images with volumetric scattering to a user.

FIG. 4 shows a system to present the images with volumetric scattering to a user. The system 400 to render an image including volumetric scattering includes a software 410, a renderer 420, and a user interface 430.

The software 410 can represent a three-dimensional scene including object 120 in FIGS. 1 and 3A-3B, and object 220 in FIG. 2. The software 410 can be Maya®, Houdini™, Cinema 4D, Autodesk® 3ds Max®, etc. The software 410 can pass a representation 440 of the three-dimensional scene to the renderer 420. The three-dimensional scene can include an indication of which object in the scene should be rendered using volumetric scattering.

The processor 450 running the renderer 420 can implement various rendering techniques 460, 470, 480, including path tracing, scattering approximation, and/or closed form solution, as described in this application.

The scattering approximations and the closed form solutions described in FIGS. 3A-3B are but two of the multiple versions of the cheaper rendering techniques. Each version of the cheaper rendering techniques produces an image that can be predictably brighter or darker compared to the image produced using path tracing. The renderer can obtain the information a priori about an expected brightness associated with each cheaper rendering technique, where the expected brightness is measured with respect to the path tracing technique. The renderer can automatically determine how to combine one or more cheaper rendering techniques based on one or more expected brightness levels.

The renderer can predict the expected brightness of each cheaper rendering technique based on the threshold number of interactions within the volume after which the cheaper rendering technique is employed. For example, the lower the threshold number, the darker the closed form rendering solution. In another example, the renderer can predict the expected brightness of the cheaper rendering technique based on size of the volume, scattering coefficient of the volume, absorption coefficient of the volume, and the threshold number. For example, if the absorption coefficient is high and the scattering coefficient is low, the cheaper rendering techniques can have the same brightness as the simulation because the volume is not translucent. In another example, if the size of the object is thin, and the scattering coefficient is high, the cheaper rendering techniques can have lower brightness than the simulation because the volume is translucent.

For example, assume that the expected brightness of the dipole approximation is 20% darker than path tracing and the expected brightness of sum of Gaussians is 50% brighter than path tracing. Consequently, to obtain the desired brightness, namely, the brightness corresponding to the brightness of path tracing, the renderer can weigh the color computed through the dipole approximation and the sum of Gaussians in the following way:

pixel color=⅗*(dipole approximation)+⅖*(sum of Gaussians)

The renderer 420 can provide the rendered image 490 to the user through the user interface 430. The user can adjust the weighing of the various cheaper rendering approximations through the user interface 430 and can provide the new weights 405 to the renderer 420. The user can adjust the weights of the cheaper rendering techniques with or without the renderer making an initial weight assignment. For example, the user can see the image 490 rendered using only a single cheaper rendering technique and can decide to combine two different cheaper rendering techniques.

Figure 5A:
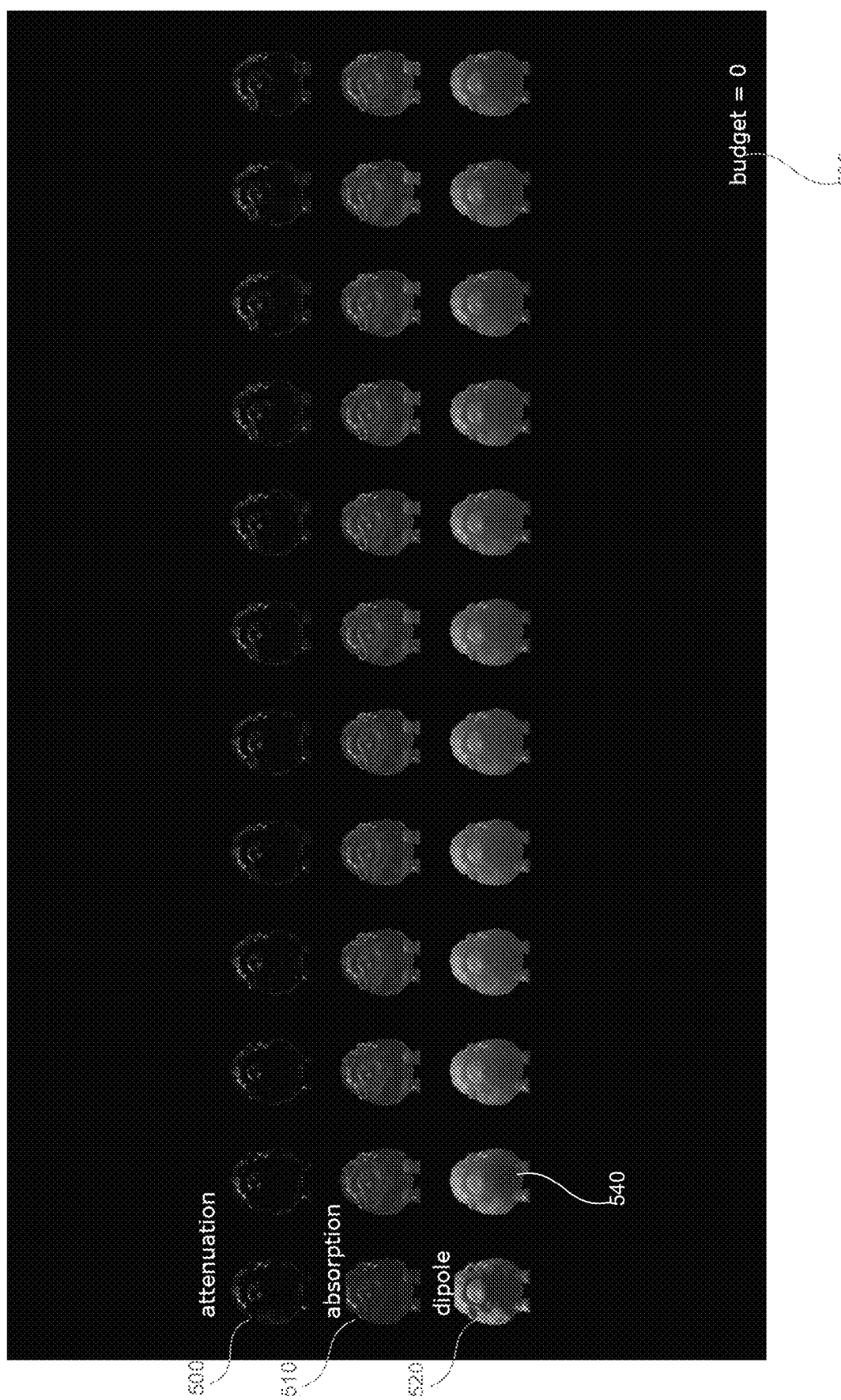
FIGS. 5A-5C show images obtained using various combinations of the simulation and cheaper rendering techniques.
Figure 5B:
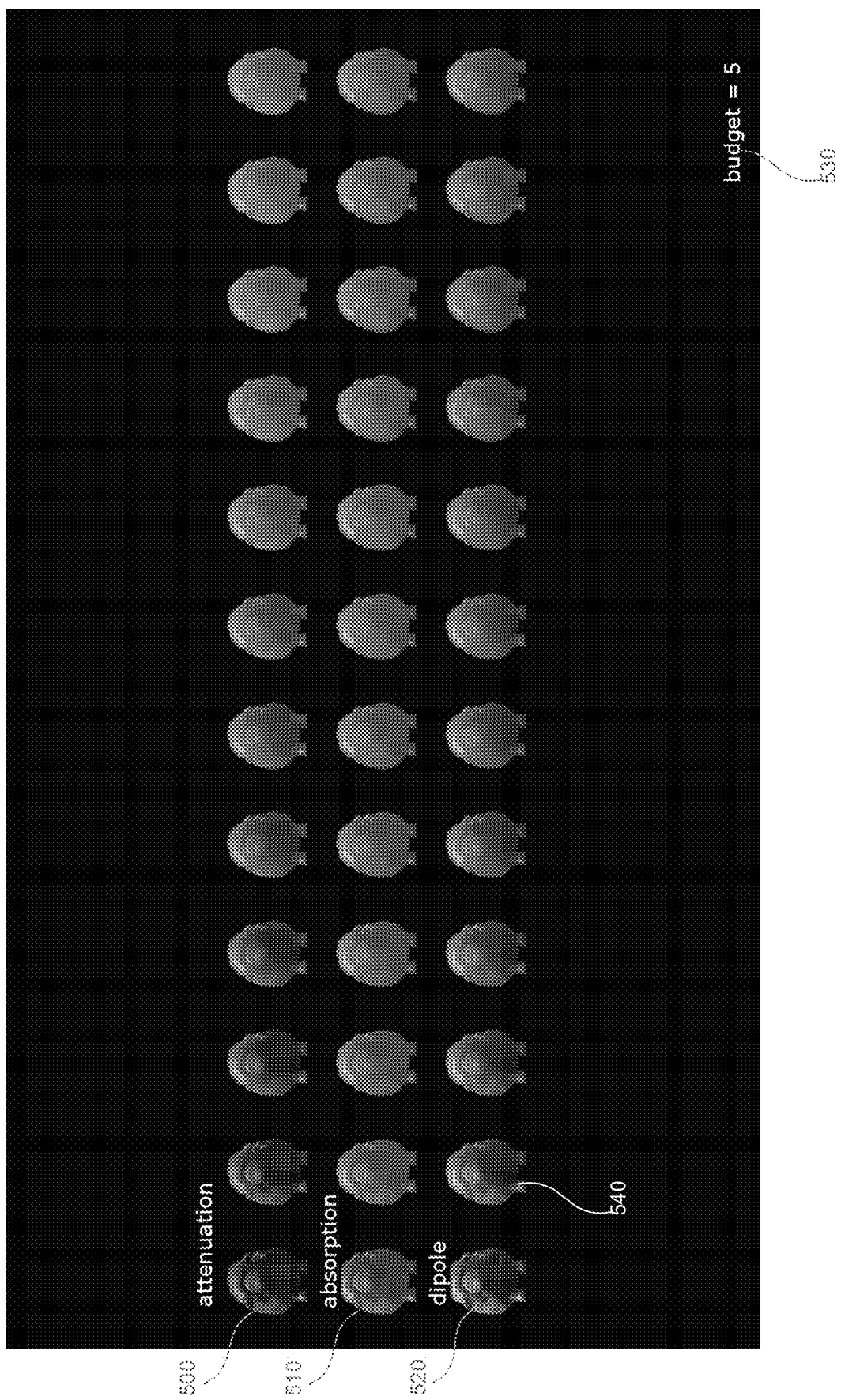
Figure 5C:
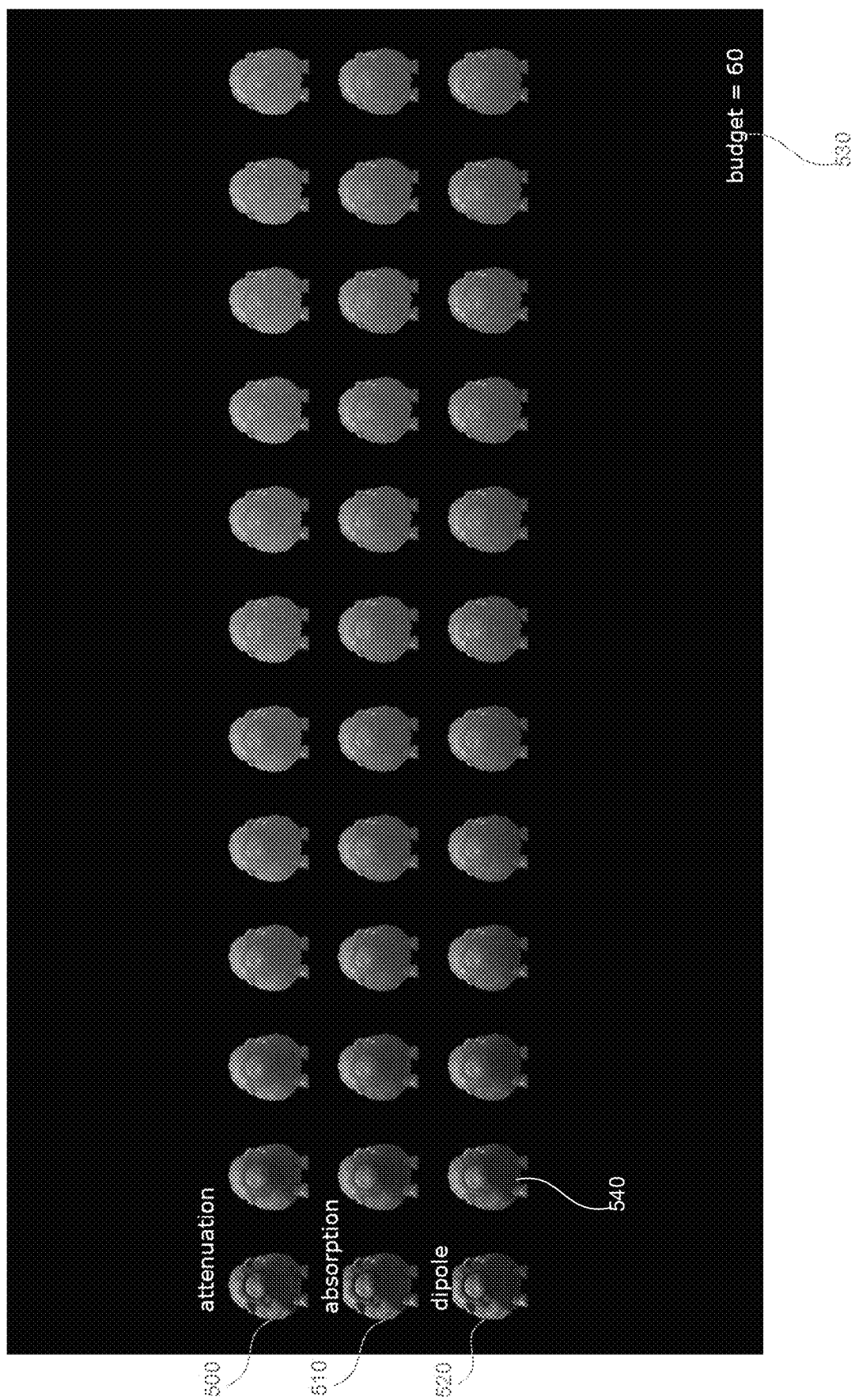

FIGS. 5A-5C show images obtained using various combinations of the simulation and cheaper rendering techniques. Rows 500, 510 in FIGS. 5A-5C show the images obtained using path tracing along with a closed formula solution. In row 500, the formula includes the out-scattering, which models deflection of the virtual ray of light in different directions. The energy of the ray decreases exponentially with increasing distance.

In row 510 the formula used is the Beer's law. Beer's law can be expressed as $$\text{Energy} = e^{(-distance*absorption)}$$

where energy is the energy of the virtual ray of light, distance is the distance the ray travels through the volume, and absorption is the absorption coefficient of the volume. As can be seen from the above formula, the energy of the virtual ray of light decreases exponentially with the distance traveled through the volume.

Row 520 shows the images obtained using the path probing along with a dipole rendering technique. The counter 530 shows the number of interactions after which the simulation is terminated. The higher the number of interactions, the more illumination that comes from path tracing, but the slower the computation. The variation in the images from left to right shows increasing translucency of the object 540. With increased translucency, the objects are less dense and more see-through, and virtual rays are more likely to find a way through the object.

In FIG. 5A, the threshold number is 0, meaning that no path tracing is performed. Rows 500, 510 in FIG. 5A show the results of a closed form solution rendering technique, while row 520 shows the results of dipole rendering technique. As can be seen, the rendering technique shown in row 500 produces darker results than the rendering technique shown in the row 510, which produces darker results than the rendering technique shown in the row 520. The renderer can combine the various rendering techniques based on their expected brightness shown in rows 500, 510, 520, as described in this application. Brightness can represent an energy per wavelength.

In FIG. 5B, the threshold number of interactions is five. To produce images in the rows 500, 510, the renderer combines the color of path tracing up to five scattering events and the color of two different closed form solutions. Consequently, the brightness of the images in the rows 500, 510 is increased because a portion of the illumination comes from path tracing.

In FIG. 5C, the threshold number of interactions is 60. With 60 interactions, most of the illumination is produced by path tracing, and the illumination in the images in the rows 500, 510, 520 are similar.

Figure 6A:
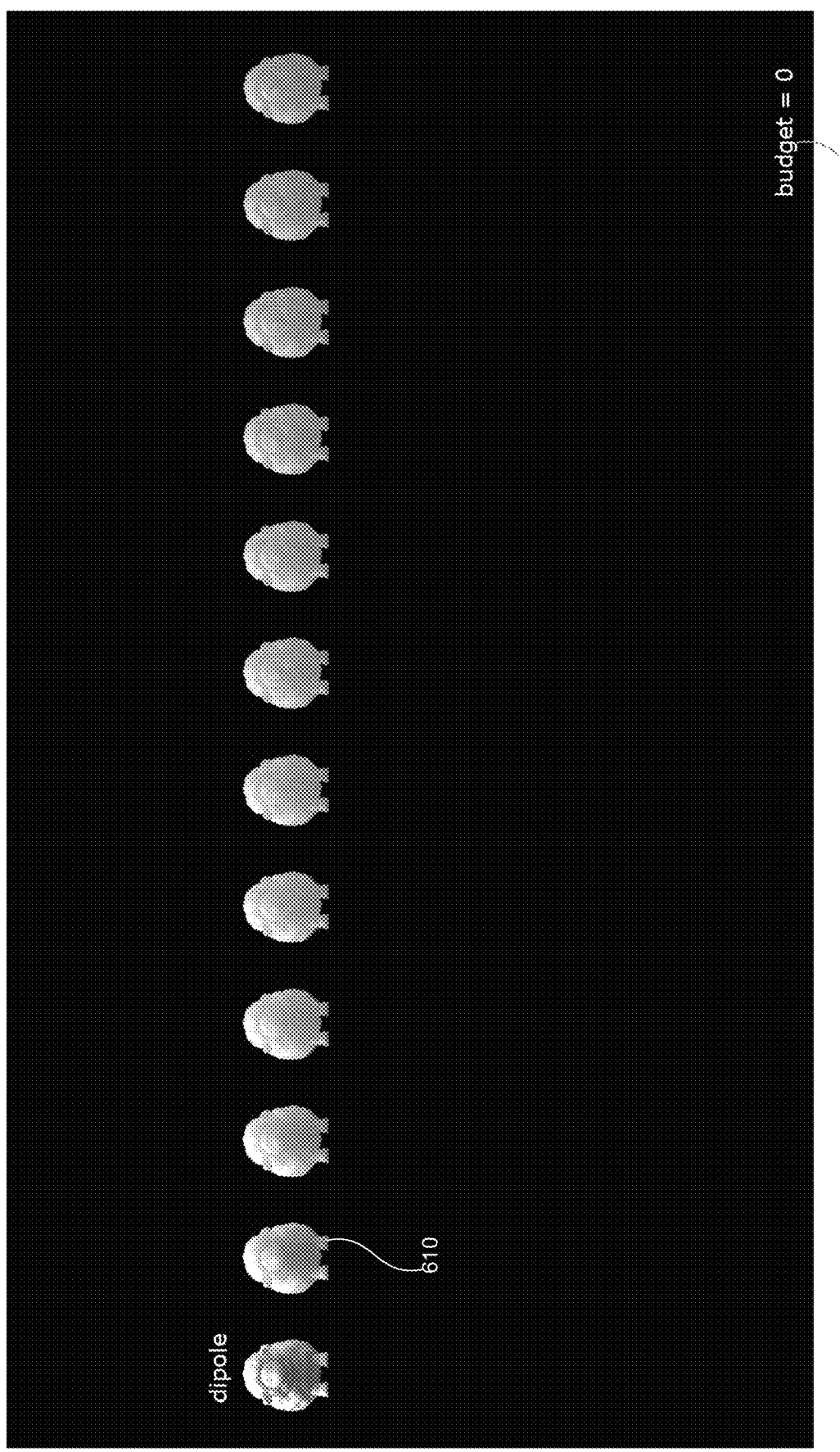
FIGS. 6A-6C show areas of an image that are rendered using the simulation and areas of the images that are rendered using a cheaper rendering technique.
Figure 6B:
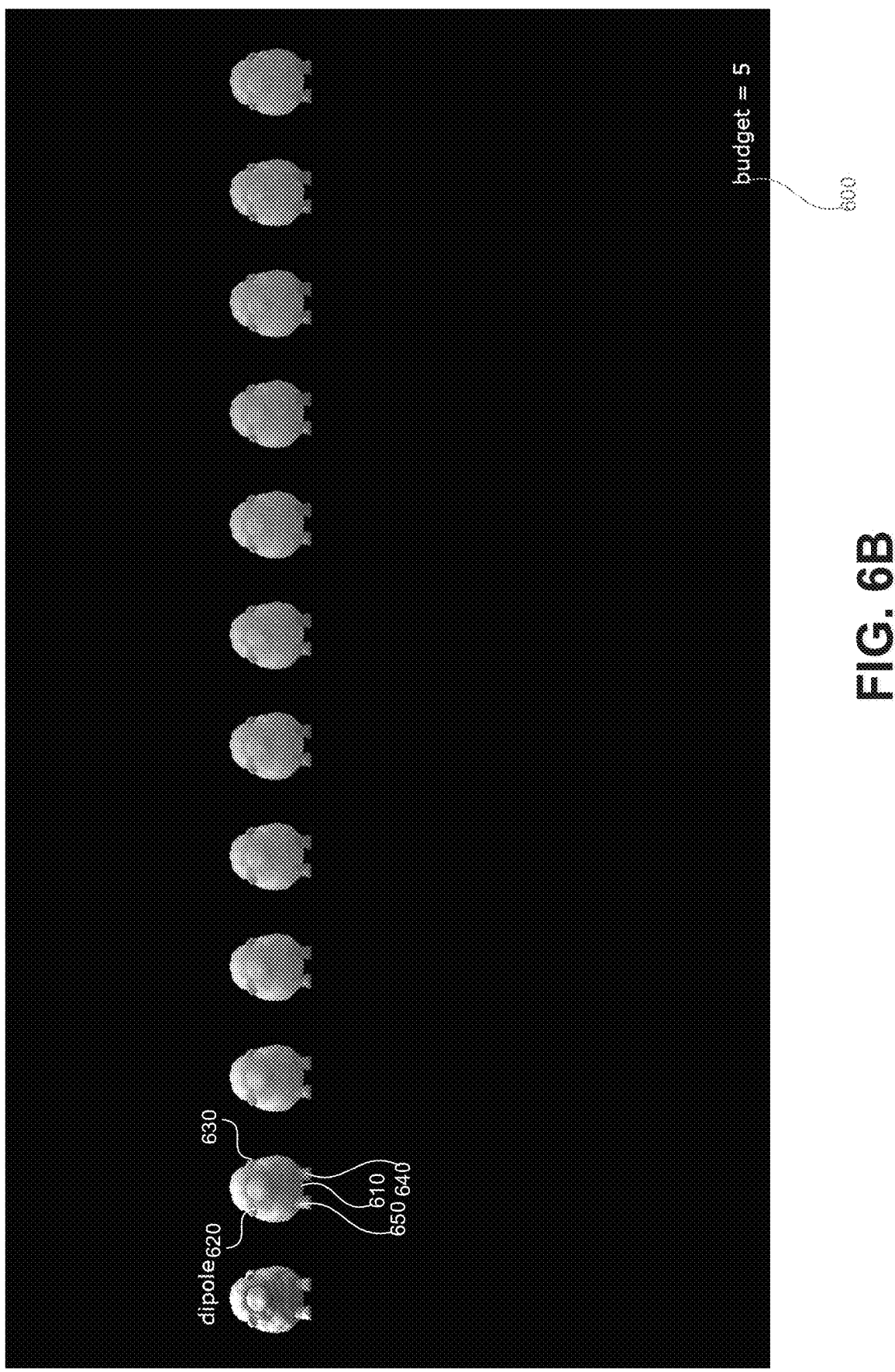
Figure 6C:
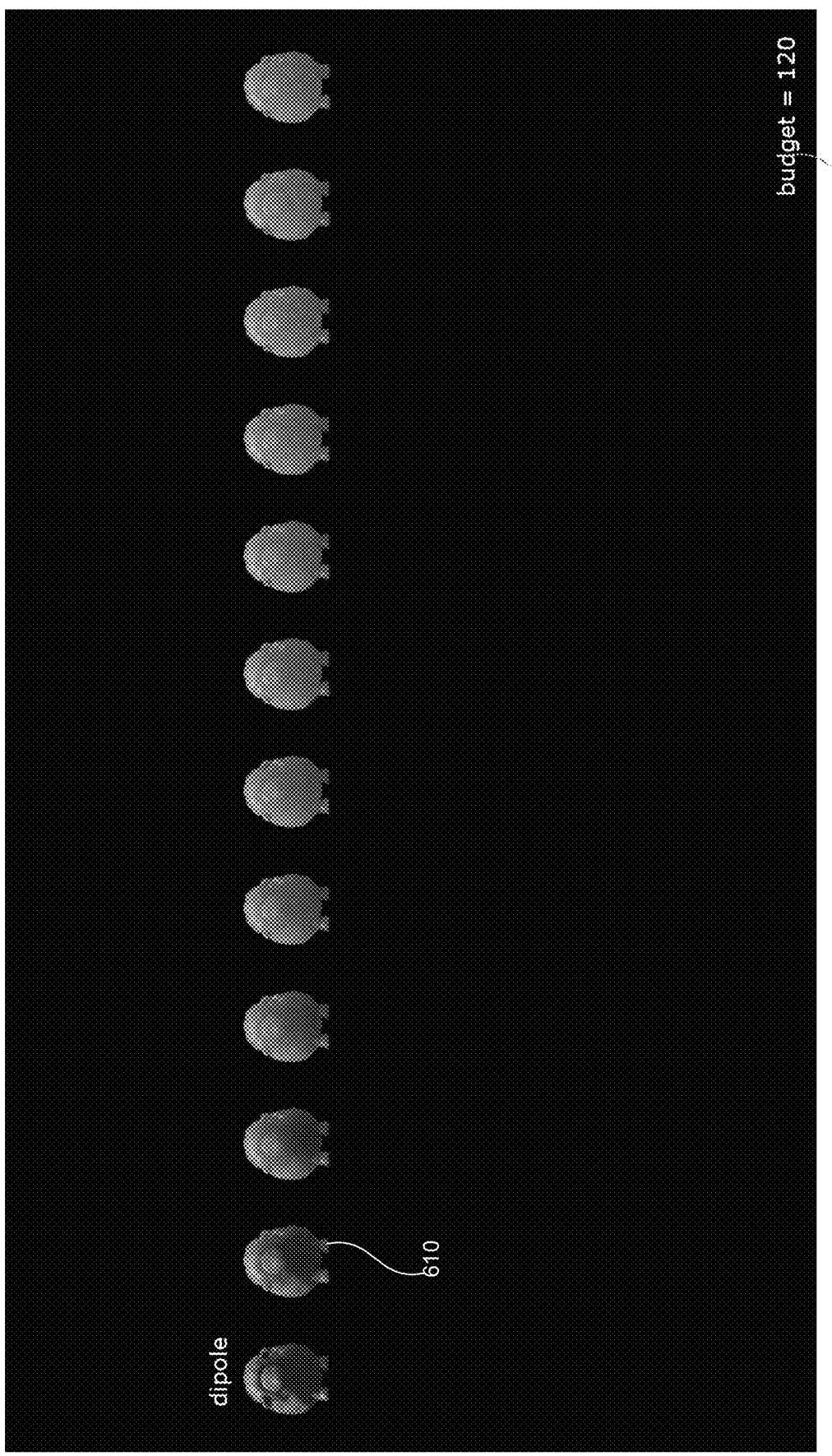

FIGS. 6A-6C show areas of an image that are rendered using the simulation and areas of the images that are rendered using a cheaper rendering technique. In FIGS. 6A-6C, a white color indicates areas of the image rendered using the cheaper rendering techniques, such as the dipole approximation, while a pink color indicates areas of the image rendered using the simulation. The count 600 indicates the threshold number of interactions after which the simulation is terminated. The variation in the images from left to right shows increasing translucency of the object 610.

In FIG. 6A, the threshold number is 0, meaning that no path tracing is performed. Consequently, the images in FIG. 6A are white. In FIG. 6B, the threshold number is 5, meaning that path tracing is terminated after 5 scattering events. As can be seen in FIG. 6B, when the object 610 is not translucent, and when the threshold number is 5, thin areas 620, 630, such as the ears, and high curvature areas 640, 650 are path traced. In FIG. 6C, the threshold number is 120, meaning that path tracing is terminated after 120 scattering events. After 120 scattering events, most of the virtual rays exit the object 610, and the color of the resulting image is mainly based on path tracing. Consequently, all the images in FIG. 6C are pink indicating they were rendered using path tracing.

Figure 7:
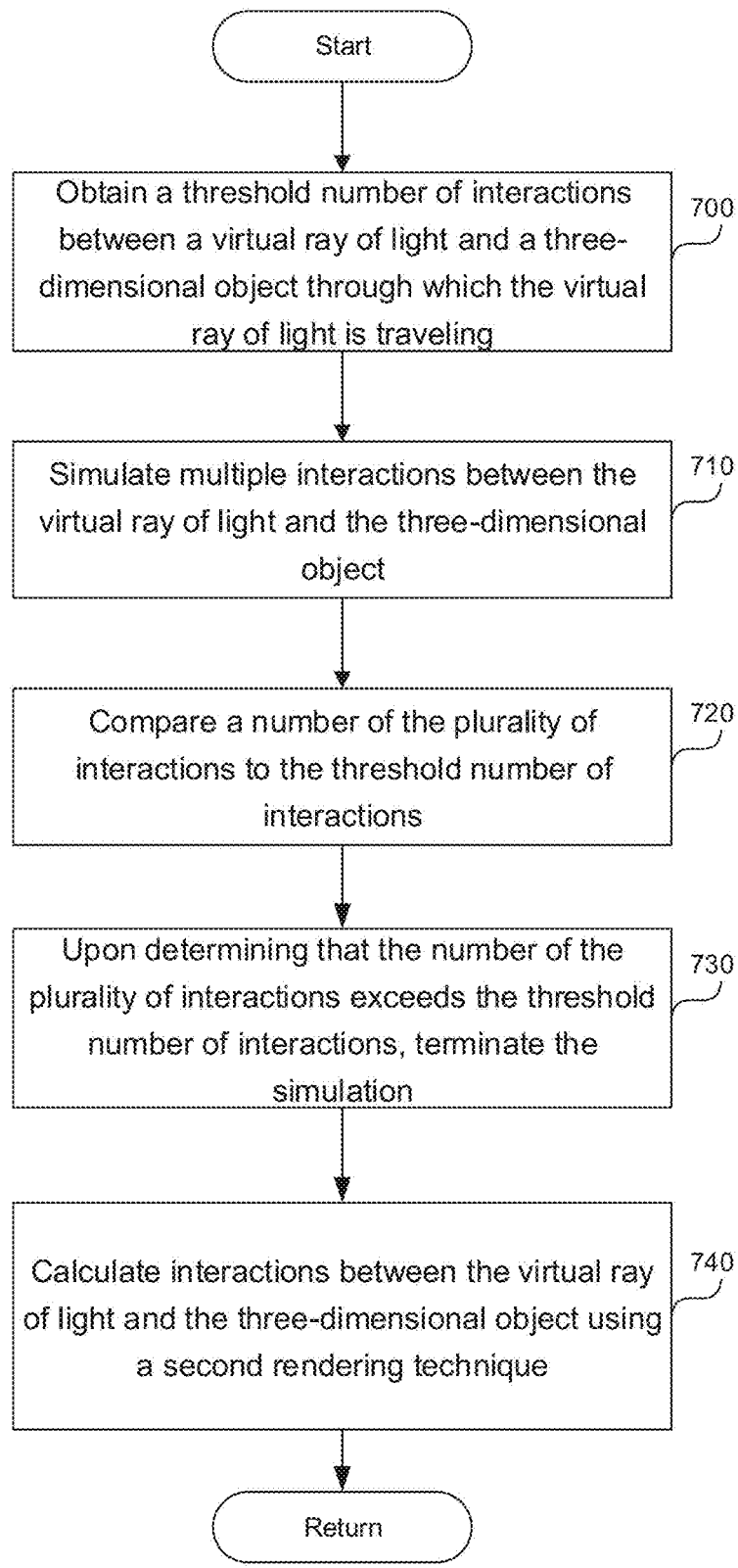
FIG. 7 is a flowchart of a method to increase a speed of computation of a volumetric scattering render technique, according to one embodiment.

FIG. 7 is a flowchart of a method to increase a speed of computation of a volumetric scattering render technique, according to one embodiment. In block 700, hardware or software processor executing instructions describing this application can obtain a threshold number of interactions between a virtual ray of light and a three-dimensional object through which the virtual ray of light is traveling. The interactions can include reflection, absorption or reflection at the surface of the three-dimensional object. The ray includes one or more wavelengths of electromagnetic radiation. The one or more wavelengths can be wavelengths in the visible electromagnetic spectrum.

In block 710, the processor can simulate multiple interactions between the virtual ray of light and the three-dimensional object, by, for example, path tracing the ray of light through the volume occupied by the three-dimensional object. In block 720, the processor can compare a number of the multiple interactions to the threshold number of interactions.

In block 720, upon determining that the number of the multiple interactions exceeds the threshold number of interactions, the processor can terminate the simulation of the multiple interactions. In block 730, the processor can calculate, e.g. approximate, interactions between the virtual ray of light and the three-dimensional object using a second rendering technique. The second rendering technique can be more desirable than the path tracing according to various metrics such as use of computational resources, and/or visual appeal, etc. For example, the second rendering technique can be computationally less expensive in CPU consumption, memory consumption, and/or bandwidth consumption than simulating the multiple interactions. In another example, the second rendering technique can produce a more visually appealing result by for example reducing the noise in the resulting image.

In one embodiment, to approximate the interactions between the virtual ray of light and the three-dimensional object the processor can use a formula, as described in this application. Specifically, the processor can combine the result of the computation from the simulation and the result of the computation from the approximation to obtain the energy contribution of the ray. Specifically, upon terminating the simulation of the multiple interactions, the processor can compute a first energy per wavelength associated with the virtual ray of light at multiple sample points associated with the three-dimensional object, based on a formula depending on a distance between a termination point and an exit point from the three-dimensional object, as described in FIG. 3B. The first energy per wavelength can be the energy of the virtual ray of light, for a wavelength contained in the virtual ray of light. The multiple sample points can be points on a voxel grid representing the volume occupied by the three-dimensional object.

The processor can compute a second energy per wavelength associated with the virtual ray of light at the multiple sample points associated with the three-dimensional object, based on simulating the multiple interactions between the virtual ray of light and the three-dimensional object. In other words, the second energy can be computed based on the simulation.

The processor can combine the first energy and the second energy corresponding to the same wavelength to obtain an energy per wavelength associated with the virtual ray of light. Specifically, the processor can sum the first energy and the second energy. The processor can store the resulting energy at the multiple sample points associated with the three-dimensional object.

In another embodiment, to approximate interactions between the virtual ray of light and the three-dimensional, upon terminating the simulation of the multiple interactions, the processor can discard a contribution computed based on the simulation. Instead, the processor can compute an energy per wavelength associated with the virtual ray of light at multiple sample points associated with the three-dimensional object based on the second rendering technique to approximate interactions between the virtual ray of light and the three-dimensional object. The second rendering technique can include a dipole, a multiple, a sum of Gaussians, or any other volumetric scattering technique that is computationally cheaper than path tracing.

In a third embodiment, to approximate interactions between the virtual ray of light and the three-dimensional object, the processor can combine multiple rendering techniques that are cheaper than the simulation. The processor can obtain multiple rendering techniques computationally less expensive than simulating the multiple interactions, such as a dipole, multiple, a sum of Gaussians, etc. The processor can obtain an expected brightness associated with each rendering technique among the multiple rendering techniques. The processor can approximate interactions between the virtual ray of light and the three-dimensional object by combining one or more rendering techniques among the multiple rendering techniques based on one or more expected brightness associated with the one or more rendering techniques.

Figure 8:
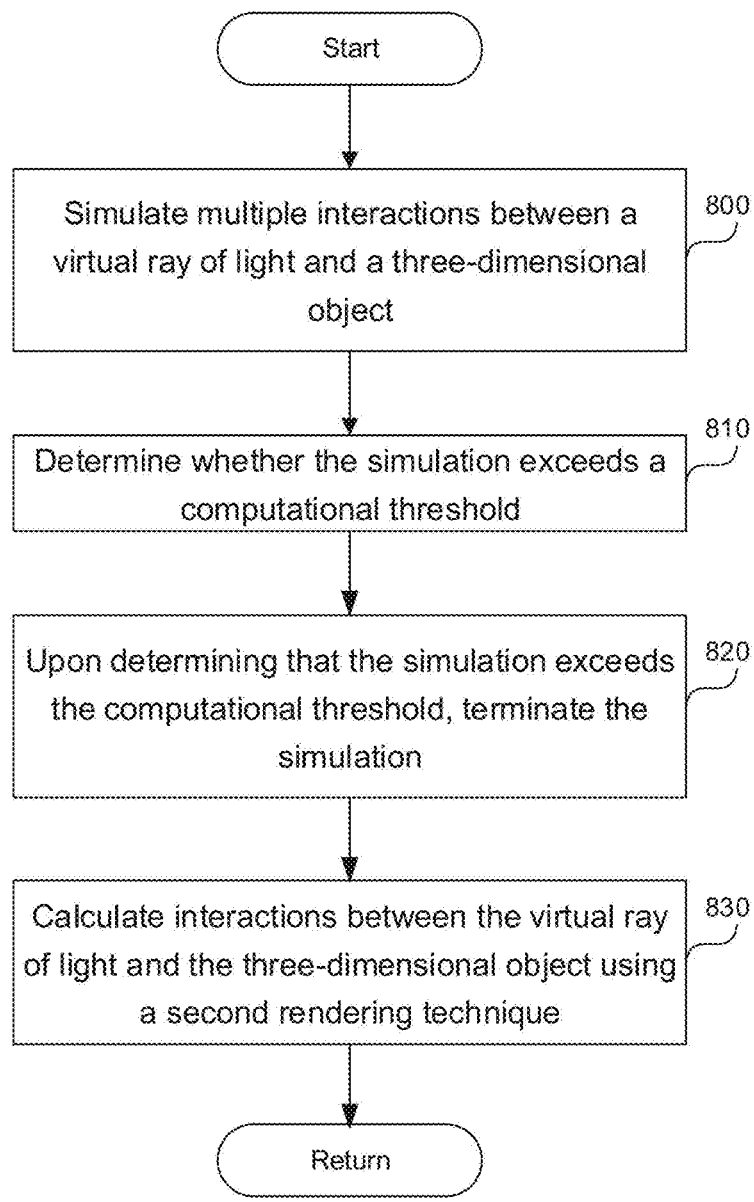
FIG. 8 is a flowchart of a method to increase a speed of computation of a volumetric scattering render technique, according to another embodiment.

FIG. 8 is a flowchart of a method to increase a speed of computation of a volumetric scattering render technique, according to another embodiment. In block 800, the processor can simulate multiple interactions between a virtual ray of light and a three-dimensional object, as described in this application.

In block 810, the processor can determine whether the simulation includes a computational threshold. The computational threshold can include a total amount of memory used, a total number of CPU cycles used, and/or a total number of multiple interactions simulated.

In block 820, upon determining that the simulation has exceeded the computational threshold, the processor can terminate the simulation of the multiple interactions. In block 830, the processor can calculate, e.g. approximate, interactions between the virtual ray of light and the three-dimensional object using a second rendering technique. The second rendering technique can be more desirable than the path tracing according to various metrics such as use of computational resources, and/or visual appeal, etc. For example, the second rendering technique can be computationally less expensive in CPU consumption, memory consumption, and/or bandwidth consumption than simulating the multiple interactions. In another example, the second rendering technique can produce a more visually appealing result by for example reducing the noise in the resulting image. The processor can perform additional steps such as the ones described in this application, for example in FIG. 7.

Visual Content Generation System

Figure 9:
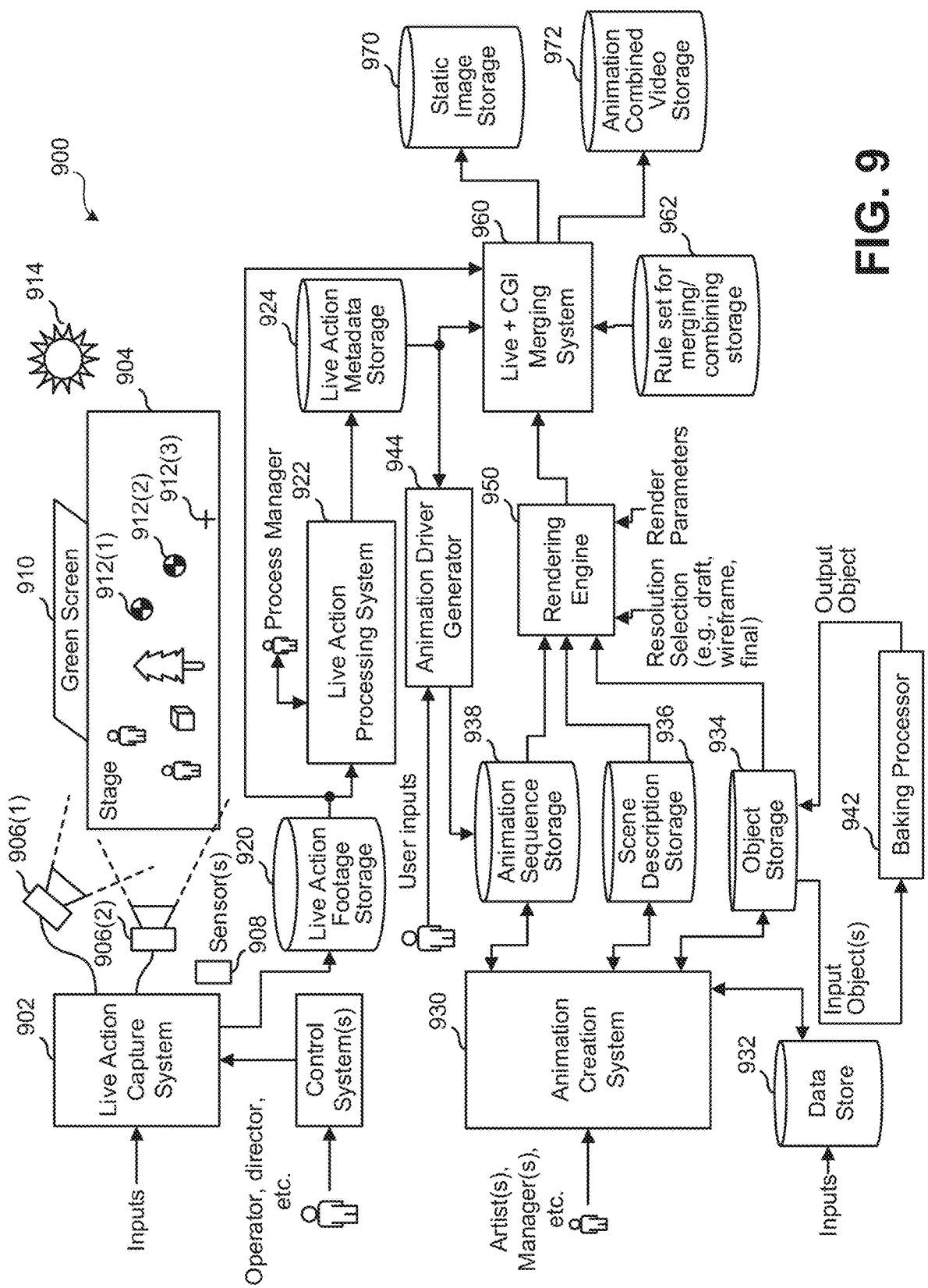
FIG. 9 illustrates an example visual content generation system as might be used to generate imagery in the form of still images and/or video sequences of images.

FIG. 9 illustrates an example visual content generation system 900 as might be used to generate imagery in the form of still images and/or video sequences of images. Visual content generation system 900 might generate imagery of live action scenes, computer generated scenes, or a combination thereof. In a practical system, users are provided with tools that allow them to specify, at high levels and low levels where necessary, what is to go into that imagery. For example, a user might be an animation artist and might use visual content generation system 900 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 900 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a certain structured format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors —and thereby generating imagery —can be more complicated, as there are lighting issues, reflections, interpolations, and other considerations.

As illustrated in FIG. 9, a live action capture system 902 captures a live scene that plays out on a stage 904. Live action capture system 902 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 906(1) and 906(2) capture the scene, while in some systems, there might be other sensor(s) 908 that capture information from the live scene (e.g., infrared cameras, infrared sensors, motion capture ("mo-cap") detectors, etc.). On stage 904, there might be human actors, animal actors, inanimate objects, background objects, and possibly an object such as a green screen 910 that is designed to be captured in a live scene recording in such a way that it is easily overlaid with computer-generated imagery. Stage 904 might also contain objects that serve as fiducials, such as fiducials 912(1)-(3), that might be used post-capture to determine where an object was during capture. A live action scene might be illuminated by one or more lights, such as an overhead light 914.

During or following the capture of a live action scene, live action capture system 902 might output live action footage to a live action footage storage 920. A live action processing system 922 might process live action footage to generate data about that live action footage and store that data into a live action metadata storage 924. Live action processing system 922 might include computer processing capabilities, image processing capabilities, one or more processors, program code storage for storing program instructions executable by the one or more processors, as well as user input devices and user output devices, not all of which are shown. Live action processing system 922 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 914, as that might be useful in post-processing to match computer-generated lighting on objects that are computer-generated and overlaid on the live action footage. Live action processing system 922 might operate autonomously, perhaps based on predetermined program instructions, to generate and output the live action metadata upon receiving and inputting the live action footage. The live action footage can be camera-captured data as well as data from other sensors.

An animation creation system 930 is another part of visual content generation system 900. Animation creation system 930 might include computer processing capabilities, image processing capabilities, one or more processors, program code storage for storing program instructions executable by the one or more processors, as well as user input devices and user output devices, not all of which are shown. Animation creation system 930 might be used by animation artists, managers, and others to specify details, perhaps programmatically and/or interactively, of imagery to be generated. From user input and data from a database or other data source, indicated as a data store 932, animation creation system 930 might generate and output data representing objects (e.g., a horse, a human, a ball, a teapot, a cloud, a light source, a texture, etc.) to an object storage 934, generate and output data representing a scene into a scene description storage 936, and/or generate and output data representing animation sequences to an animation sequence storage 938.

Scene data might indicate locations of objects and other visual elements, values of their parameters, lighting, camera location, camera view plane, and other details that a rendering engine 950 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 930 might be interactive, allowing a user to read in animation sequences, scene descriptions, object details, etc. and edit those, possibly returning them to storage to update or replace existing data. As an example, an operator might read in objects from object storage into a baking processor 942 that would transform those objects into simpler forms and return those to object storage 934 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 932 might be used to drive object presentation. For example, if an artist is creating an animation of a spaceship passing over the surface of the Earth, instead of manually drawing or specifying a coastline, the artist might specify that animation creation system 930 is to read data from data store 932 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 944 might read in live action metadata, such as data representing movements and positions of body parts of a live actor during a live action scene. Animation driver generator 944 might generate corresponding animation parameters to be stored in animation sequence storage 938 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 922. Animation driver generator 944 might convert that movement data into specifications of how joints of an articulated CGI character are to move over time.

A rendering engine 950 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 950 might include computer processing capabilities, image processing capabilities, one or more processors, program code storage for storing program instructions executable by the one or more processors, as well as user input devices and user output devices, not all of which are shown.

Visual content generation system 900 can also include a merging system 960 that merges live footage with animated content. The live footage might be obtained and input by reading from live action footage storage 920 to obtain live action footage, by reading from live action metadata storage 924 to obtain details such as presumed segmentation in captured images segmenting objects in a live action scene from their background (perhaps aided by the fact that green screen 910 was part of the live action scene), and by obtaining CGI imagery from rendering engine 950.

A merging system 960 might also read data from rulesets for merging/combining storage 962. A very simple example of a rule in a ruleset might be "obtain a full image including a two-dimensional pixel array from live footage, obtain a full image including a two-dimensional pixel array from rendering engine 950, and output an image where each pixel is a corresponding pixel from rendering engine 950 when the corresponding pixel in the live footage is a specific color of green, otherwise output a pixel value from the corresponding pixel in the live footage."

Merging system 960 might include computer processing capabilities, image processing capabilities, one or more processors, program code storage for storing program instructions executable by the one or more processors, as well as user input devices and user output devices, not all of which are shown. Merging system 960 might operate autonomously, following programming instructions, or might have a user interface or programmatic interface over which an operator can control a merging process. In some embodiments, an operator can specify parameter values to use in a merging process and/or might specify specific tweaks to be made to an output of merging system 960, such as modifying boundaries of segmented objects, inserting blurs to smooth out imperfections, or adding other effects. Based on its inputs, merging system 960 can output an image to be stored in a static image storage 970 and/or a sequence of images in the form of video to be stored in an animated/combined video storage 972.

Thus, as described, visual content generation system 900 can be used to generate video that combines live action with computer-generated animation using various components and tools, some of which are described in more detail herein. While visual content generation system 900 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying image data or other data having details generated using the methods described herein. The carrier medium can comprise any medium suitable for carrying the image data or other data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal or an electrical signal.

Computer System

Figure 10:
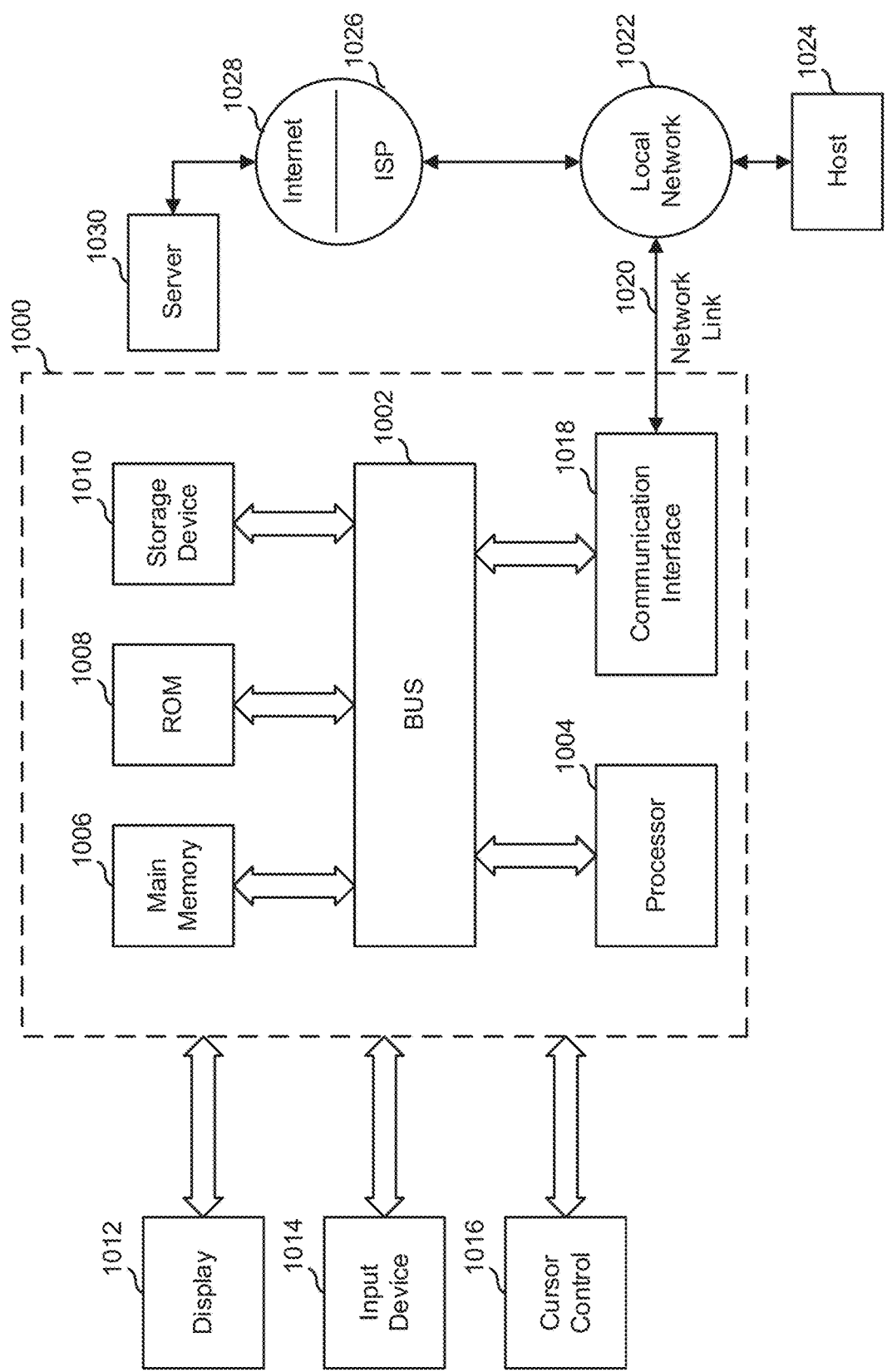
FIG. 10 is a block diagram that illustrates a computer system upon which the computer systems of the systems described herein and/or visual content generation system may be implemented.

FIG. 10 is a block diagram that illustrates a computer system 1000 upon which the computer systems of the systems described herein and/or visual content generation system 900 (see FIG. 9) may be implemented. Computer system 1000 includes a bus 1002 or other communication mechanism for communicating information, and a processor 1004 coupled with bus 1002 for processing information. Processor 1004 may be, for example, a general-purpose microprocessor.

Computer system 1000 also includes a main memory 1006, such as a random-access memory (RAM) or other dynamic storage device, coupled to bus 1002 for storing information and instructions to be executed by processor 1004. Main memory 1006 may also be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a computer monitor, for displaying information to a computer user. An input device 1014, including alphanumeric and other keys, is coupled to bus 1002 for communicating information and command selections to processor 1004. Another type of user input device is a cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a network connection. A modem or network interface local to computer system 1000 can receive the data. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be a network card, a modem, a cable modem, or a satellite modem to provide a data communication connection to a corresponding type of telephone line or communications line. Wireless links may also be implemented. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world-wide packet data communication network now commonly referred to as the "Internet" 1028. Local network 1022 and Internet 1028 both use electrical, electromagnetic, or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020, and communication interface 1018. In the Internet example, a server 1030 might transmit a requested code for an application program through the Internet 1028, ISP 1026, local network 1022, and communication interface 1018. The received code may be executed by processor 1004 as it is received, and/or stored in storage device 1010, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents, applications, and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A method comprising:
    simulating a first plurality of interactions between a virtual ray of light and a three-dimensional object;
    determining whether a number of the first plurality of interactions exceeds a computational threshold;
    upon determining that the number of the first plurality of interactions exceeds the computational threshold, terminating the simulation of the first plurality of interactions; and
    approximating a second plurality of interactions between the virtual ray of light and the three-dimensional object using a second rendering technique computationally less expensive than simulating the second plurality of interactions, wherein the approximating comprises:
        upon terminating the simulation of the first plurality of interactions, discarding a contribution computed based on simulating the first plurality of interactions between the virtual ray of light and the three-dimensional object; and
        computing an energy per wavelength associated with the virtual ray of light at a plurality of sample points associated with the three-dimensional object based on the second rendering technique to approximate the second plurality of interactions between the virtual ray of light and the three-dimensional object.

2. The method of claim 1, wherein the computational threshold includes a threshold number of interactions, the method comprising:
    obtain the threshold number of interactions between the virtual ray of light and the three-dimensional object through which the virtual ray of light is traveling,
        wherein at least one interaction among a number of interactions includes a reflection,
        wherein the virtual ray of light includes one or more wavelengths of electromagnetic radiation;
    comparing the number of the first plurality of interactions to the threshold number of interactions;
    upon determining that the number of the first plurality of interactions exceeds the threshold number of interactions, terminating the simulation of the first plurality of interactions; and
    approximating the second plurality of interactions between the virtual ray of light and the three-dimensional object using the second rendering technique.

3. The method of claim 1, wherein approximating the second plurality of interactions between the virtual ray of light and the three-dimensional object comprises:
    upon terminating the simulation of the first plurality of interactions, computing a first energy per wavelength associated with the virtual ray of light at the plurality of sample points associated with the three-dimensional object, based on a formula depending on a distance between a termination point and an exit point from the three-dimensional object;
    computing a second energy per wavelength associated with the virtual ray of light at the plurality of sample points associated with the three-dimensional object, based on simulating the first plurality of interactions between the virtual ray of light and the three-dimensional object; and
    combining the first energy per wavelength and the second energy per wavelength to obtain the energy per wavelength associated with the virtual ray of light at the plurality of sample points associated with the three-dimensional object.

4. The method of claim 1, wherein approximating the second plurality of interactions between the virtual ray of light and the three-dimensional object comprises:
    obtaining a plurality of rendering techniques computationally less expensive than simulating the second plurality of interactions,
        wherein the plurality of rendering techniques includes the second rendering technique;
    obtaining an expected brightness associated with each rendering technique in the plurality of rendering techniques; and
    approximating the second plurality of interactions between the virtual ray of light and the three-dimensional object by combining one or more rendering techniques in the plurality of rendering techniques based on one or more expected brightness associated with the one or more rendering techniques.

5. The method of claim 1, wherein simulating the first plurality of interactions comprises path tracing.

6. The method of claim 1, the second rendering technique comprising a dipole approximation or a sum of Gaussians approximation.

7. At least one computer-readable storage medium, excluding transitory signals and carrying instructions, which, when executed by at least one data processor of a system, cause the system to:
    simulate a first plurality of interactions between a virtual ray of light and a three-dimensional object;
    determine whether the simulation exceeds a computational threshold;
    upon determining that the simulation exceeds the computational threshold, terminate the simulation of the first plurality of interactions; and
    calculate a second plurality of interactions between the virtual ray of light and the three-dimensional object using a second rendering technique by:
        upon terminating the simulation of the first plurality of interactions, discarding a contribution computed based on simulating the first plurality of interactions between the virtual ray of light and the three-dimensional object; and
        computing an energy per wavelength associated with the virtual ray of light at a plurality of sample points associated with the three-dimensional object based on the second rendering technique to calculate the second plurality of interactions between the virtual ray of light and the three-dimensional object.

8. The storage medium of claim 7, wherein the computational threshold includes a threshold number of interactions, the storage medium comprising instructions to cause the system to:
    obtain the threshold number of interactions between the virtual ray of light and the three-dimensional object through which the virtual ray of light is traveling,
        wherein at least one interaction among a number of interactions includes a reflection,
        wherein the virtual ray of light includes one or more wavelengths of electromagnetic radiation;
    compare a number of the first plurality of interactions to the threshold number of interactions;
    upon determining that the number of the first plurality of interactions exceeds the threshold number of interactions, terminate the simulation of the first plurality of interactions; and calculate the second plurality of interactions between the virtual ray of light and the three-dimensional object using the second rendering technique.

9. The storage medium of claim 7, the instructions to cause the system to calculate the second plurality of interactions between the virtual ray of light and the three-dimensional object comprising the instructions to cause the system to:
   upon terminating the simulation of the first plurality of interactions, compute a first energy per wavelength associated with the virtual ray of light at the plurality of sample points associated with the three-dimensional object, based on a formula depending on a distance between a termination point and an exit point from the three-dimensional object;
   compute a second energy per wavelength associated with the virtual ray of light at the plurality of sample points associated with the three-dimensional object, based on simulating the first plurality of interactions between the virtual ray of light and the three-dimensional object; and
   combine the first energy per wavelength and the second energy per wavelength to obtain the energy per wavelength associated with the virtual ray of light at the plurality of sample points associated with the three-dimensional object.

10. The storage medium of claim 7, the instructions to cause the system to calculate the second plurality of interactions between the virtual ray of light and the three-dimensional object comprising the instructions to cause the system to:
   obtain a plurality of rendering techniques computationally less expensive than simulating the second plurality of interactions,
      wherein the plurality of rendering techniques includes the second rendering technique;
   obtain an expected brightness associated with each rendering technique in the plurality of rendering techniques; and
   calculate the second plurality of interactions between the virtual ray of light and the three-dimensional object by combining one or more rendering techniques in the plurality of rendering techniques based on one or more expected brightness associated with the one or more rendering techniques.

11. The storage medium of claim 7, the instructions to cause the system to simulate the first plurality of interactions comprising instructions to cause the system to perform path tracing.

12. The storage medium of claim 7, the second rendering technique comprising a dipole approximation or a sum of Gaussians approximation.

13. The storage medium of claim 7, wherein the second rendering technique is computationally less expensive than simulating the second plurality of interactions.

14. A system comprising:
   at least one hardware processor; and
   at least one non-transitory memory storing instructions, which, when executed by the at least one hardware processor, cause the system to:
      simulate a first plurality of interactions between a virtual ray of light and a three-dimensional object;
      determine whether the simulation exceeds a computational threshold;
      upon determining that the simulation exceeds the computational threshold, terminate the simulation of the first plurality of interactions; and
      calculate a second plurality of interactions between the virtual ray of light and the three-dimensional object using a second rendering technique by:
         upon terminating the simulation of the first plurality of interactions, discarding a contribution computed based on simulating the first plurality of interactions between the virtual ray of light and the three-dimensional object; and
         computing an energy per wavelength associated with the virtual ray of light at a plurality of sample points associated with the three-dimensional object based on the second rendering technique to calculate the second plurality of interactions between the virtual ray of light and the three-dimensional object.

15. The system of claim 14, wherein the computational threshold includes a threshold number of the second plurality of interactions, the memory includes the instructions to cause the system to:
   obtain a threshold number of interactions between the virtual ray of light and the three-dimensional object through which the virtual ray of light is traveling,
      wherein at least one interaction among a number of interactions includes a reflection,
      wherein the virtual ray of light includes one or more wavelengths of electromagnetic radiation;
   compare a number of the first plurality of interactions to the threshold number of interactions;
   upon determining that the number of the first plurality of interactions exceeds the threshold number of interactions, terminate the simulation of the first plurality of interactions; and
   calculate the second plurality of interactions between the virtual ray of light and the three-dimensional object using the second rendering technique.

16. The system of claim 14, the instructions to cause the system to calculate the second plurality of interactions between the virtual ray of light and the three-dimensional object comprising the instructions to cause the system to:
   upon terminating the simulation of the first plurality of interactions, compute a first energy per wavelength associated with the virtual ray of light at the plurality of sample points associated with the three-dimensional object, based on a formula depending on a distance between a termination point and an exit point from the three-dimensional object;
   compute a second energy per wavelength associated with the virtual ray of light at the plurality of sample points associated with the three-dimensional object, based on simulating the first plurality of interactions between the virtual ray of light and the three-dimensional object; and
   combine the first energy per wavelength and the second energy per wavelength to obtain the energy per wavelength associated with the virtual ray of light at the plurality of sample points associated with the three-dimensional object.

17. The system of claim 14, the instructions to cause the system to calculate the second plurality of interactions between the virtual ray of light and the three-dimensional object comprising the instructions to cause the system to:
   obtain a plurality of rendering techniques computationally less expensive than simulating the second plurality of interactions,
      wherein the plurality of rendering techniques includes the second rendering technique;

obtain an expected brightness associated with each rendering technique in the plurality of rendering techniques; and calculate the second plurality of interactions between the virtual ray of light and the three-dimensional object by combining one or more rendering techniques in the plurality of rendering techniques based on one or more expected brightness associated with the one or more rendering techniques.

18. The system of claim 14, the instructions to cause the system to simulate the first plurality of interactions comprising instructions to cause the system to perform path tracing.

19. The system of claim 14, the second rendering technique comprising a dipole approximation or a sum of Gaussians approximation.

20. The system of claim 14, wherein the second rendering technique is computationally less expensive than simulating the second plurality of interactions.

* * * * *